United States Patent
Minarik et al.

(10) Patent No.: US 6,823,599 B1
(45) Date of Patent: Nov. 30, 2004

(54) ALIGNMENT STRUCTURE AND METHOD FOR MULTIPLE FIELD CAMERA

(75) Inventors: Philip R. Minarik, Schaumburg, IL (US); Sung-Shik Yoo, Palatine, IL (US); Wayne W. Winder, Crystal Lake, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/681,677

(22) Filed: Oct. 8, 2003

(51) Int. Cl.[7] .................. G01C 15/00; G01B 11/26
(52) U.S. Cl. ............................................. 33/286
(58) Field of Search .................. 33/613, 645, 286, 33/1 M, 573, 266, 546, 547, 568, 569; 250/332, 208.1, 370.08; 396/373, 384

(56) References Cited

U.S. PATENT DOCUMENTS 3,915,575 A * 10/1975 Sick ........................ 33/286
5,075,201 A    12/1991 Koh
5,479,015 A    12/1995 Rudman et al.
6,694,630 B2 *  2/2004 Dang et al. ............... 33/286

* cited by examiner

Primary Examiner—Christopher W. Fulton
(74) Attorney, Agent, or Firm—Stetina Brunda Garred & Brucker

(57) ABSTRACT

An alignment structure and an alignment method which generates a plurality of spot images from the same light source and aligns individual spot images between different fields in independently steps without affecting the alignment of other spot images. The camera has a plurality of focusing members referenced to a common focal plane array of a plurality of detectors. The alignment structure has a light source, a collimator and a multiple-beam generator. A light beam generated by the camera is collimated and split into a plurality of components converging on the camera at angles within field of view of the camera. Multiple fields of a plurality of spot images are formed on the focal plane. By translating and rotating the focusing members, distances of the corresponding spot images between different fields are minimized to align the camera.

24 Claims, 4 Drawing Sheets

ALIGNMENT STRUCTURE AND METHOD FOR MULTIPLE FIELD CAMERA

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to alignment structure and method for a multiple-field camera, and more particular, to alignment structure and method to align the multiple-field camera using a single spot light source.

Image registration is a fundamental task required in many applications of image processing which involves taking two or more images and aligning them so as to either eliminate differences between them or highlight the salient differences for the purpose of study. The former situation occurs within such areas as target matching and the latter when producing depth information from stereo pairs or mapping changes over time. Currently, there are essentially four different types of registration, including multi-modal registration, template registration, viewpoint registration and temporal registration. In multi-modal registration, images have been taken by different types of sensors. In template registration, a referenced image is to be found inside a larger image. This is useful for locating a specific feature on a map. The viewpoint registration images the same object with two similar sensors at the same moment from different positions, while temporal registration photographs the same object from the same viewpoint at different times. Single element multiple field cameras have been designed to capture well aligned temporally registered images. To obtain sub-pixel accuracy of any of the above registrations between optical fields, well-registered and stable camera configurations are required.

An integrated lens has been used in the single element multiple field cameras. In this design, the lens position is constantly referenced to the same mechanical plane referred as a focal plane. This minimizes allowable movements critical to maintaining alignment. However, since the manufacture of the focal plane leaves position errors of greater than 1/10 pixel of the camera to external physical features (typically 2 microns), a mechanical alignment to physical attributes is not possible unless pixels are visible.

In U.S. Pat. No. 5,479,015, a multi-image detector assembly has been disclosed. The multi-image detector assembly allows image detection occurring continuously and simultaneously so as to provide a spatially and temporally correlated set of separate images utilizing a single focal plane. However, alignment or correction of position of the focal plane relative to the lens is not addressed.

BRIEF SUMMARY OF THE INVENTION

The present invention provides an alignment structure and an alignment method which generate a plurality of spot images from the same light source and aligns individual spot images between different fields independently without affecting the alignment of other spot images. The camera includes a plurality of focusing members referenced to a common focal plane array of a plurality of detectors. The alignment structure comprises a light source, a collimator and a multiple-beam generator. The light source is operative to generate a light beam suitable for spectral characteristics of the camera, and the collimator collimates the light beam into a collimated light spot with a predetermined dimension. The multiple-beam generator then splits the light beam into a plurality of components converging on the camera at angles within field of view of the camera. In one embodiment, the predetermined dimension is larger than one pixel and smaller than three pixels of the camera to result in a spot image with energy significant in the region of 5×5 pixels of the focal plane.

The multiple-beam generator further comprises a platform, a central aperture, a plurality of peripheral apertures, a plurality of first mirrors and a plurality of second mirrors. The central aperture perforates through a center of the platform by a dimension smaller than the predetermined dimension of the collimated light spot. Therefore, by aligning the centroid of the collimated light spot with the central aperture, only a central portion of the collimated light beam propagates through the platform as a central component. The peripheral apertures are formed by perforating the platform about the central aperture. The first mirrors are arranged on the platform to split the edge portion of the collimated light spot into a plurality of peripheral components and reflect the peripheral components onto the second mirrors, while the second mirrors are positioned and oriented to reflect the peripheral components to propagate through the apertures and converge at the focusing members. The first and second mirrors are further adjusted to converge the peripheral components at the camera at angles approaching field of view of the camera.

The alignment structure further comprises a kinematic stage for disposing the focusing members of the camera thereon. The kinetic stage is preferably operative to translate and rotate the focusing members with 6 degrees of freedom. Therefore, the orientations and positions of focusing members of the camera can be adjusted to optimize the spot images captured on the focal plane from the central and peripheral components.

The present invention further provides a single-element multiple-field camera system comprising a camera and an alignment structure. The camera comprises a plurality of focusing members and a common focal plane array of a plurality of detectors for the focusing members. The alignment structure comprises a light source operative to generate a light beam suitable for spectral characteristics of the camera, a collimator disposed along an optical path of the light beam generated by the light source, a multiple-beam generator disposed along an optical path of the light beam propagating through the collimator, and a kinematic stage for translating and rotating the focusing members relative to the focal plane array.

The focusing members are integrated into a single slab of material, and the material includes silicon. The collimator is operative to collimate the light beam generated by the light source into a collimated spot light with a dimension larger than one detector and smaller than three detectors of the focal plane array. The multiple-beam generator comprises a platform, a central aperture, a plurality of first mirrors, a plurality of second mirrors, and a plurality of peripheral apertures. The platform is disposed perpendicular to propagation of the collimated spot light. The central aperture is perforated through the platform and aligned with centroid of the collimated spot light. The first mirrors are mounted on the platform and are positioned and oriented to split an edge portion of the collimated spot light into a plurality of peripheral components. The peripheral apertures are perforated through the platform around the central aperture. The second mirrors are mounted on the platform and positioned and oriented to reflect the peripheral components to propagate through the peripheral apertures and converge at the camera By the above alignment structure, a central spot image and a plurality of peripheral spot images around the central spot image are formed on the focal plane array for each focusing member. The camera can thus be aligned by translating and rotating the focusing members along various directions to overlap the central and peripheral spot images formed for different focusing members.

In one embodiment, the multiple-beam generator includes four first mirrors, four second mirrors and four peripheral apertures arranged to split the edge portion of the light source into four peripheral components; and consequently, four peripheral spot images are formed by each focusing member.

The present invention further provides an alignment method for a camera with a multiple-element lens and a focal plane array of pixels. The method comprises the following steps. A light beam suitable for spectral characteristics of the camera is generated. The light beam is collimated into a light spot with a predetermined dimension. The light spot is split into one central component and a plurality of peripheral components about the central component, such that one central spot image and a plurality of peripheral spot images are formed on the focal plane array for each field of the camera. The multiple-element lens is then translated and rotated along various directions to optimize spot images of the central and peripheral components captured on the focal plane array.

In the above method, the light beam is preferably collimated into the light spot with a dimension larger than one pixel and smaller than three pixels of the camera. The light spot is preferably split into the central and peripheral components converging at the multiple-element lens with angles within field of view of the camera. The step of translating and rotating the multiple-element lens comprises the following steps (a) to (g). In step (a), the multiple-element lens is translated along a first direction for coarsely focusing the central and peripheral spot images. In step (b), the multiple-element lens is rotated about the first direction for minimizing distance of the central spot images between the fields. In step (c), the multiple-element lens is rotated along a second direction and a third direction perpendicular to the first direction for offsetting difference of origins between the fields. In step (d), the multiple-element lens is rotated about the first direction for refining alignment of central spot images between the fields. In step (e), the multiple-element lens is rotated about the second direction to minimize distance of the peripheral spot images arranged along the second direction between the fields. In step (f), the multiple-element lens is rotated about the third direction to minimize distance of the peripheral spot images arranged along the third direction between the fields. In step (g), the multiple-element lens is translated along the first direction for further focusing the central and peripheral spot images.

The alignment method as discussed above further comprising repeating steps (d) to (f) until the distances of the central components and the peripheral components between the fields are within a predetermined tolerance, and repeating step (g) until the spot images are focused within a predetermined tolerance. In one embodiment, the predetermined tolerance of the distance is 1/10 pixel of the focal plane.

BRIEF DESCRIPTION OF THE DRAWINGS

These, as well as other features of the present invention, will become apparent upon reference to the drawings wherein.

DETAILED DESCRIPTION OF THE INVENTION

Figure 1:
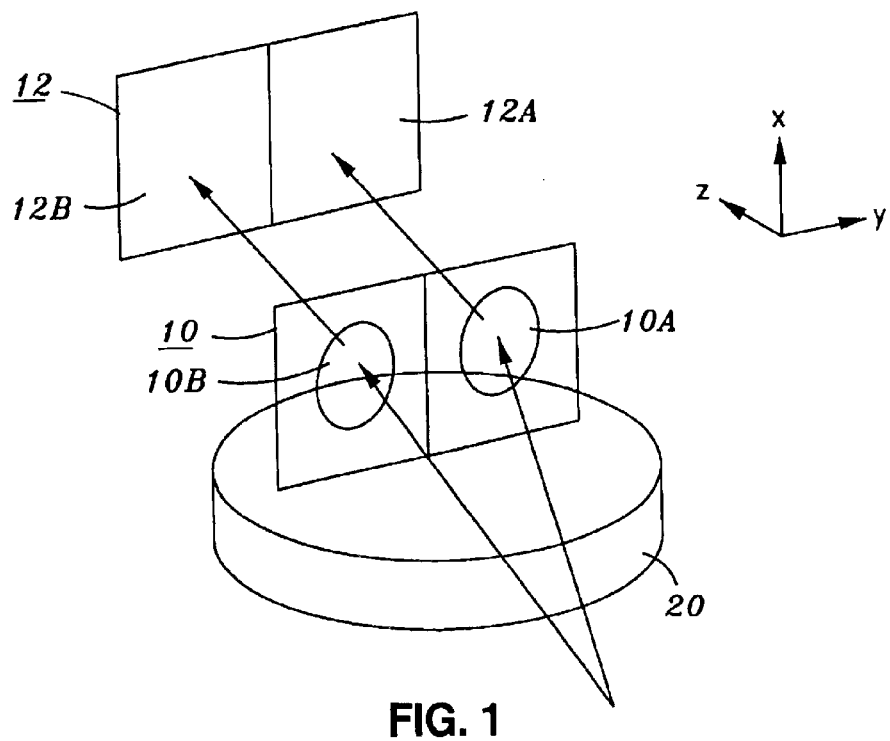
FIG. 1 is a schematic drawing of a camera system that includes a multiple-element lens on a single element.

The present invention provides alignment structure and algorithm of a single element multiple field camera. A camera system that employs a multiple-element lens or several individual lenses mounted to a single element referenced to a single focal plane can be aligned with high precision with the alignment structure provided by the present invention. FIG. 1 shows an exemplary camera system that employs a multiple-element lens which integrates two focusing members or lens members into a single slab of material such as silicon (Si). As shown in FIG. 1, the camera comprises a multiple-element lens 10 and a focal plane 12. In this embodiment, two focusing members 10A and 10B are integrated as the multiple-element lens 10, such that when an imaging light beam is incident on the multiple-element lens 10 within the range of the input apertures (the circles as shown in FIG. 1), two images are focused and captured by detectors (pixels) formed on two sections 12A and 12B of the focal plane 12. It will be appreciated that in addition to the focusing functions, according to specific requirement, the multiple-element lens 10 may further provide other optical effects such as diffraction and refraction of the incoming light. In addition, more than two focusing members can be applied to the camera system for generating multiple fields of images on the focal plane 12.

Figure 2:
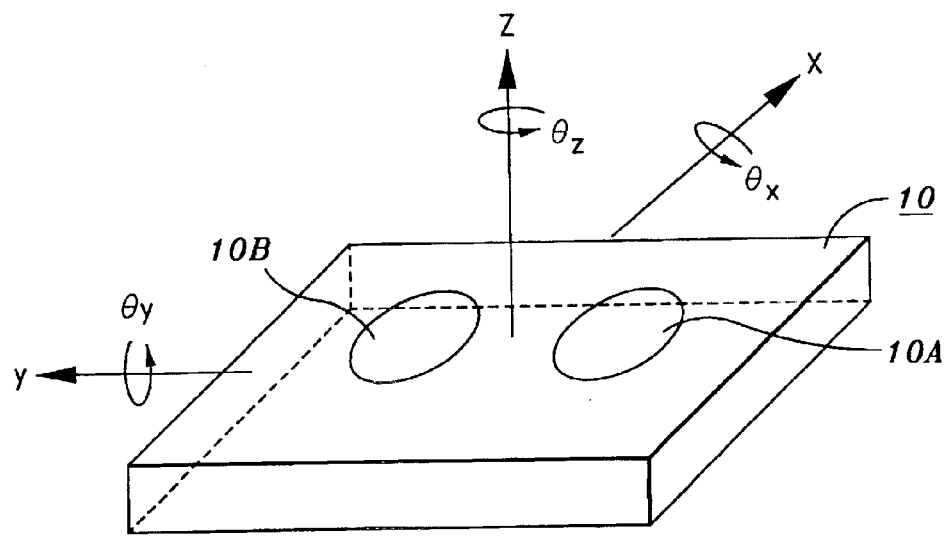
FIG. 2 shows the kinematic stage used for adjusting positions and orientations of the multiple-element lens relative to a focal plane array of the camera system.

The multiple-element lens 10 is placed on a stage 20, such that the position and orientation of the multiple-element lens 10 relative to the focal plane 12 are adjustable. In this embodiment, the stage 20 includes a kinematic stage with six degrees of freedom (DOF). That is, the multiple-element lens 10 placed on the stage 20 can be translated along three translation axes x, y, z and rotated along three rotation axis θx, θy, and θz as shown in FIG. 2. Preferably, the stage 20 must have minimum resolvable movements of about 10 orders of magnitude smaller than the maximum error allowed by the camera system. It is appreciated that stage with fewer degrees of freedom can be used if the optic is aligned correctly allowing large amounts of error in some movement.

Figure 3:
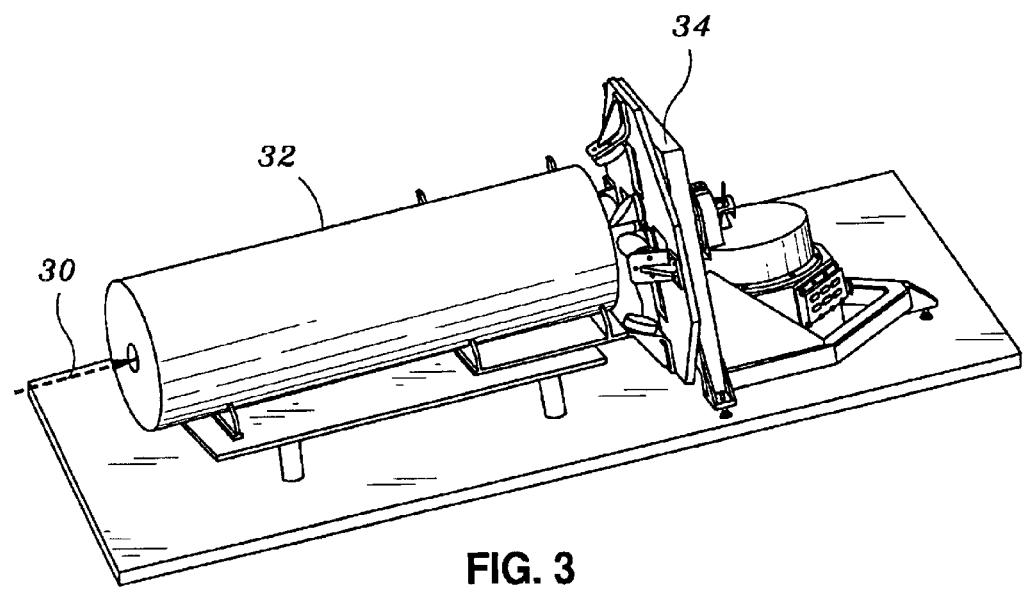
FIG. 3 shows a schematic drawing of an alignment structure for aligning the multiple-element lens.

As mentioned above, to obtain a well registered image, the multiple-element lens 10 has to be well aligned to precisely focus the incoming imaging light on the focal plane array 12. FIG. 3 shows a perspective view of an alignment structure provided by the present invention. As shown, the alignment structure, including a light source 30, a collimator 32, and a multiple beam generator (MBG) 34, is employed for aligning the multiple-element lens 10 of the camera system. The light source 30 is used to generate a light beam suitable for the spectral characteristics of the camera system. In this embodiment, a spot light source is preferred, and the collimator 32 has sufficient length and girth for collimating the light beam into a spot slightly larger than a single pixel but smaller than 3 pixels of the camera system. With the diffraction of the optics of the camera system, the energy of the spot can be significant on a region with 5×5 pixels of the focal plane 12. The spot light source Ls generated by the light source 30 and collimated by the collimator 32 is then aligned with a center of the multiple-beam generator 34.

Figure 4:
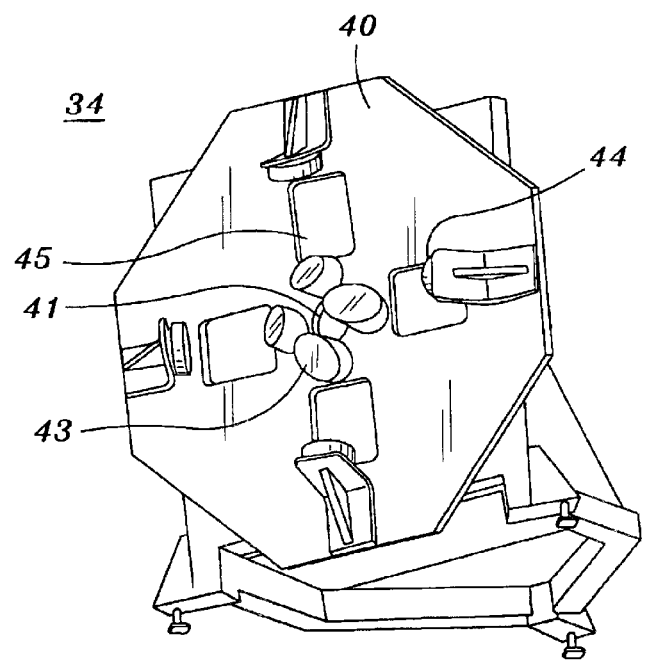
FIG. 4 shows a perspective view of the multiple-beam generator of the alignment structure as shown in FIG. 3.

FIG. 4 shows a perspective view of the multiple-beam generator 34. The multiple-beam generator 34 includes a platform 40 which is opaque to the spot light source Ls and disposed substantially perpendicular to the spot light source Ls. A plurality of propagating channels is formed through the multiple-beam generator 34 by perforating the platform 40 with one central aperture 41 at a center thereof and a plurality of peripheral apertures 45 about the central aperture 41. The diameter of the central aperture 41 is smaller than the diameter of the spot light source Ls, such that by aligning the centroid of the spot light source Ls with the aperture 41, only a central portion of the spot light source Ls propagates through the aperture 41, while the edge portion of the spot light source Ls fall on the platform 40 around the central aperture 41. This central portion of the spot light source Ls is referred as the central component Lcs of the spot light source Ls. As shown in FIG. 4, a plurality of mirrors 43 are mounted on the platform 40 around the central aperture 41, such that the edge portion of the spot light source Ls is incident on the mirrors 43 and reflected thereby. In this manner, the edge portion of the spot light source Ls is split into a plurality of edge component Les. Preferably, the mirrors 43 are located between the central aperture 41 and the peripheral apertures 45, and the multiple-beam generator 34 further comprises a plurality of mirrors 44 located at the sides of the peripheral apertures 45 opposing to the mirrors 43. The mirrors 44 are adjusted to allow the edge components Les split by each of the mirrors 43 incident thereon and reflected thereby, so as to propagate through the corresponding peripheral apertures 45. The mirrors 43 and 44 are adjustable to collimate and direct the edge components Les at a specific angle with respect to the central component Lcs. As a result, the central component Lcs and the edge components Les converge at the multiple-element lens 10 of the camera system with an angle within the field of view (FOV) of the camera system.

Figure 5:
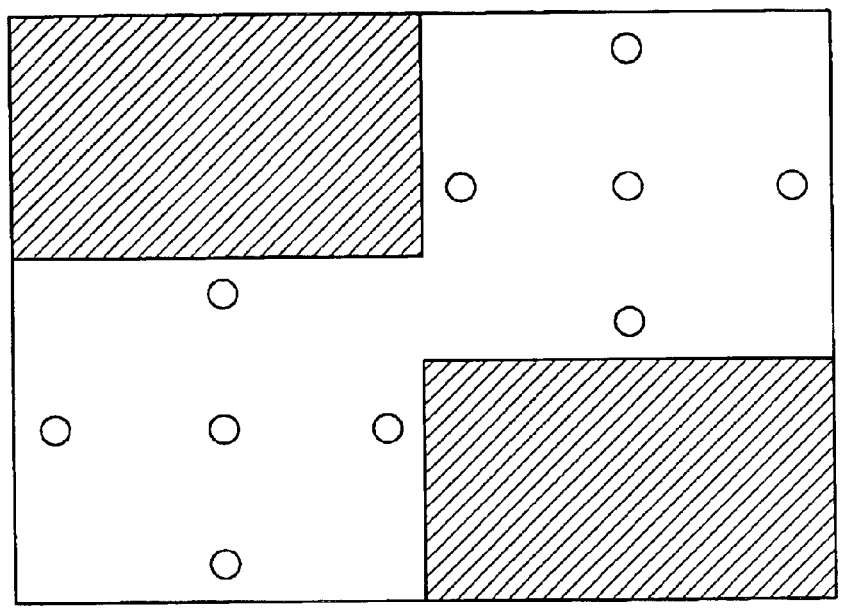
FIG. 5 shows an image captured by a camera system with dual field of views as shown in FIG. 2.

In the embodiment as shown in FIGS. 3 and 4, four peripheral apertures 45 are formed about the central aperture 41. Accordingly, the alignment structure includes four mirrors 43 mounted on the platform 40 between the central aperture 41 and the peripheral apertures 45 to generate four edge components Les and four mirrors 44 at the periphery of the platform 40 to reflect these four edge components Les. For a camera system including two focusing members 10A and 10B as shown in FIG. 2, two fields of images are obtained as shown in FIG. 5. In this embodiment, as the spot light source Ls is split into five components, including one central component Lcs and four edge components Les, five spot images, including one central spot image Ic and four peripheral spot images Ip, are captured by the focal plane array 12 for each field. As shown in FIGS. 3, 4 and FIG. 5, for each focusing members 10A and 10B, two of the peripheral spot images Ip are aligned with the central spot image Ic along a vertical direction (x-direction), while the other two of the peripheral spot images Ip are aligned with the central spot image Ic along a horizontal direction (y-direction). Therefore, one can align the multiple-lens element 10 by optimizing the central spot image Ic and the peripheral spot images Ip in separate steps. Instead of rotating the multiple-element lens 10 along various directions for each individual peripheral spot image Is, these peripheral spot images Ip can be optimized by rotating the multiple-element lens 10 about only the vertical direction and the horizontal direction. Further, though the peripheral spot image Ip and the central spot image Ic are obtained from the same light source Ls, the adjustment or optimization of the peripheral spot image Ip does not affect the adjustment or optimization of the central spot image Ic. It is appreciated that when more than two focusing members are integrated into the multiple-element lens 12, more than two fields of images are obtained on the focal plane array 12. Further, referring to FIG. 4, the platform 40 has an octagonal shape, and the mirrors 44 are mounted along every other side of the octagon, such that the edge components Les are directed along four orthogonal directions about the central component Lcs. It will be appreciated that according to specific requirement, the configuration of the platform, the number of mirrors 43 and 44, the arrangement of the mirrors 43 and 44 can be altered without exceeding the spirit and scope of the present invention.

Figure 6:
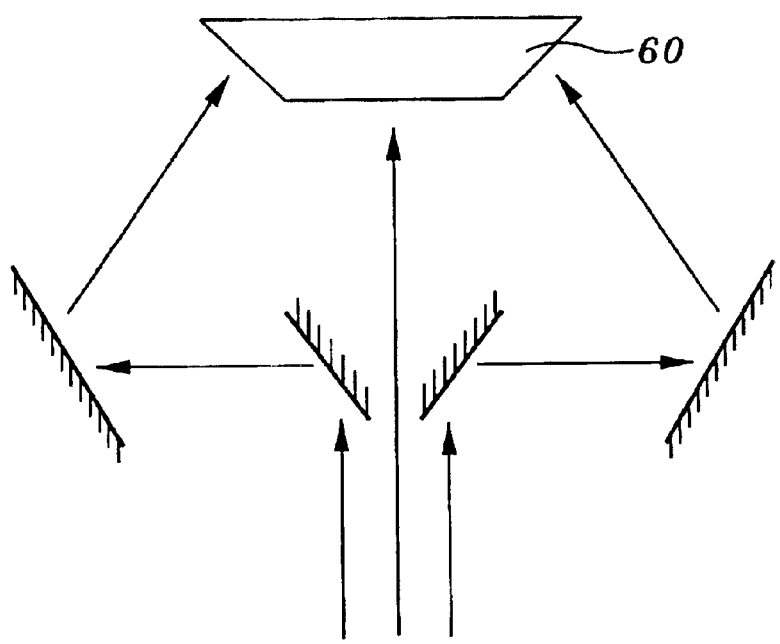
FIG. 6 shows the optical path of an autocollimator that uses retro-reflection to align the multiple-beam generator.
Figure 7:
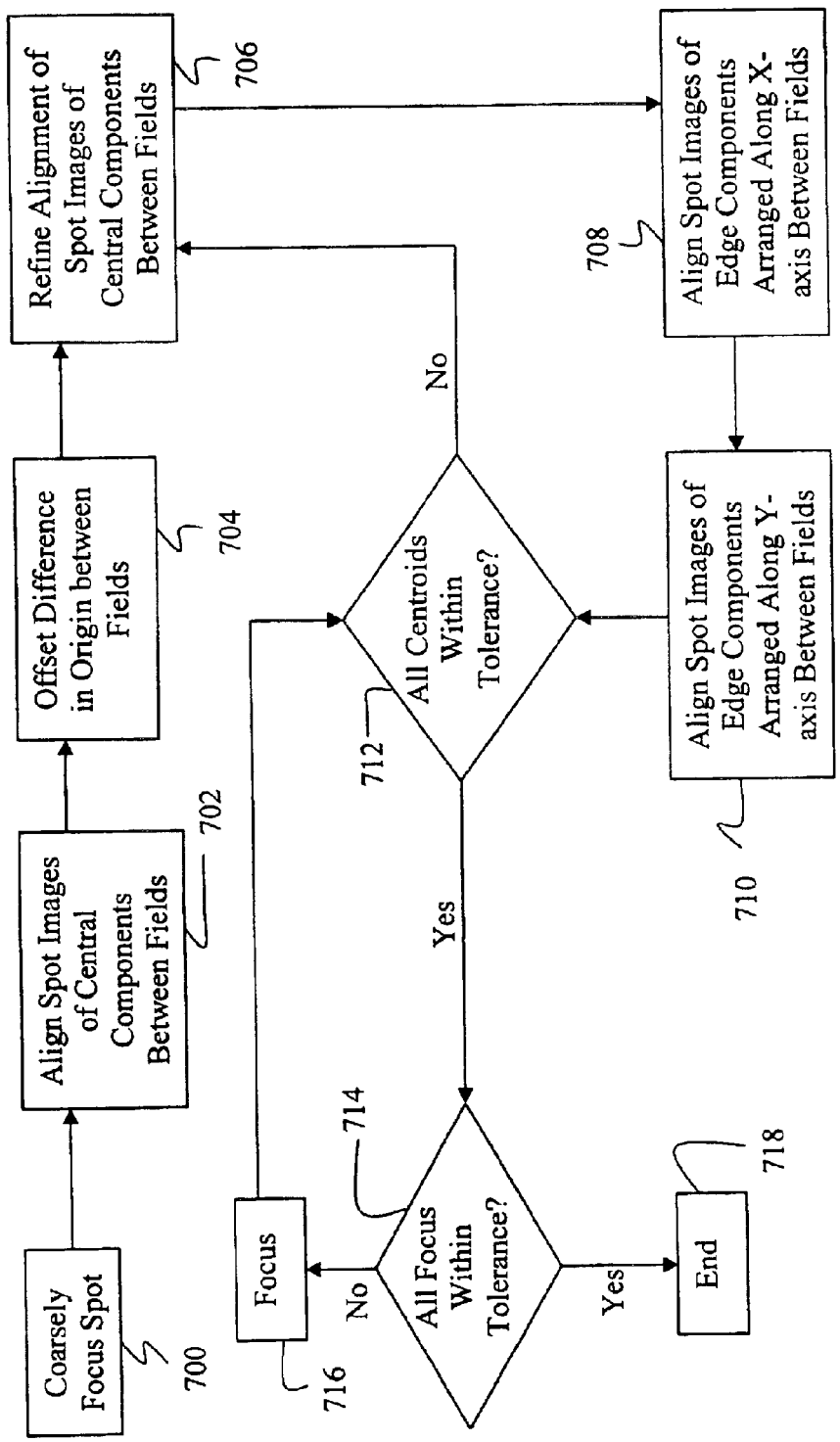
FIG. 7 shows a flow chart of the alignment algorithm provided by the present invention.

Alignment of the multiple-beam generator 34 is accomplished through retro-reflections using an autocollimator. A beam generated by the autocollimator, preferably a laser beam, is shone through the collimator and propagates through each of the channels of the multiple-beam generator 34. The optical path for the retro-reflection alignment of the multiple-beam generator 34 is illustrated as FIG. 6. As shown in FIG. 6, a mirror 60 is disposed at the place where the camera to be aligned will be located. The mirror 60 has a field of view smaller than but closer to that of the camera. The beams reflected by the mirror 60 are then aligned with each other by the autocollimator. In the present invention, perfect alignment (as far as angular precision) for the multiple-beam generator 34 is not demanded. Tolerances are probably greater than 1 degree on the precision of the alignment. This number is dependent on the system and the instantaneous field of view (IFOV) distortion at the degree of the field. This procedure can be expanded to a single element alignment procedure where a highly distorted wide field optic is aligned to a focal plane array, in which case the alignment of the multiple-beam generator 34 is critical to within 1/10 of IFOV of the camera With the alignment structure as disclosed above, one can use the central and peripheral spot images Ic and Ip to align the multiple-element lens 12 of the camera system. FIG. 7 shows the flow chart of the alignment algorithm. Referring to FIGS. 1, 2 and 7, in step 700, a coarsely focusing step is performed on the central and peripheral spot images Ic and Ip. The coarse focusing step 700 is performed by translating the multiple-element lens 10 along z-direction until the central and peripheral spot images Ic and Ip are as well focused on the focal plane array 10 as possible. The focusing condition is preferably observed by the operator; or alternatively, the focusing can be implemented by electronics which measures the energies detected by a pre-selected region and surrounding region of the pre-selected region. The energies detected by the surrounding region relative to that of the pre-selected region are then minimized by shifting the multiple-element lens 10 along z-direction.

After the coarsely focusing step 700, in step 702, the multiple-element lens 10 is rotated along θz-direction (about the z-axis) to minimize the distance between the central spot images Ic of two fields. Ideally, the central spot images Ic are overlapped with each other in step 702. However, as each focusing member 10A and 10B is manufactured with certain level of defect, the origins of these two fields may differ in positions from each other. Therefore, in step 704, the multiple-element lens 10 is translated along X- and Y-directions to offset the difference. When the manufacturing defect is compensated in step 704, a refining step 706 for minimizing the distance of central spot images Ic between these two fields is performed by rotating the multiple-element lens along θz-axis again.

When the central spot images Ic of these two fields are well aligned with each other through steps 700 to 706, in steps 708 and 710, the multiple-element lens 10 is rotated along θx and θy directions for minimizing the distances of the corresponding peripheral spot images Ip between these two fields. In the embodiment as shown in FIG. 5, two peripheral spot images Ip and the central spot image Ic in each field are captured along x-axis on the focal plane array 10, while two peripheral spot images Ip and the central spot image Ic in each field extend along y-axis on the focal plane array 10. Therefore, in step 708, the multiple-element lens 10 is rotated along θx-direction to minimize the distance of the peripheral spot images Ip along x-direction between two fields along the x-direction, and in step 710, the multiple-element lens 10 is rotated along θy-direction until the corresponding peripheral spot images Ip along y-direction between two fields overlap.

In step 710, the resultant distance of each pair of corresponding spot images between two fields is measured. If the distance is out of the tolerable range, the process flows back to step 706, and steps 706 to 710 are repeated until the distance is within the tolerable range. In this embodiment, the tolerable range is about 1/10 pixel. Therefore, when the distance between each pair of corresponding spot images in two fields is larger than 1/10 pixel, steps 706 to 710 for aligning the central and peripheral spot images Ic and Ip are repeated until the distance is no larger than 1/10 pixel of the camera system. When these two fields are well aligned with each other, the focus condition for each of the central and peripheral spot images Ic and Ip is observed in step 712. If the focusing condition falls within a tolerable range, for example, when the energies of the spot images Ic and Ip captured by the pre-selected region of the focal plane array exceeds a predetermined percentage of that of the central and edge component Lcs and Les, the alignment is complete in 716. On the contrary, when the energies of the spot images Ic and Ip captured by the pre-selected region of the focal plane array is lower than the predetermined percentage, a focus step 714 is performed by translating the multiple-element lens 10 along z-axis. Steps 710 to 714 are repeated until the distances and the focusing condition fall within the tolerable ranges.

This disclosure provides exemplary embodiments of alignment structure and alignment algorithm of a multiple-element lens camera system. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. An alignment structure for aligning a camera, the camera including a plurality of focusing members and a common focal plane array of a plurality of detectors, the alignment structure comprising:
    a light source, operative to generate a light beam suitable for spectral characteristics of the camera;
    a collimator, operative to collimate the light beam into a collimated light spot with a predetermined dimension; and
    a multiple-beam generator, operative to split the light beam into a plurality of collimated component light beams converging on the camera at angles within field of view of the camera.

2. The alignment structure of claim 1, wherein the predetermined dimension is larger than one pixel and smaller than three pixels of the camera.

3. The alignment structure of claim 1, wherein the multiple-beam generator further comprises:
    a platform;
    a central aperture perforating through a center of the platform, wherein the central aperture has a dimension smaller than the predetermined dimension of the collimated light spot;
    a plurality of peripheral apertures perforating through the platform about the central aperture;
    a plurality of central mirrors mounted on the platform between the central aperture and the peripheral apertures; and
    a plurality of peripheral mirrors mounted on a periphery of the platform around the peripheral apertures.

4. The alignment structure of claim 3, wherein the central aperture of the multiple-beam generator is aligned with centroid of the collimated light spot to form a central component of the collimated light spot incident on the focusing members of the camera.

5. The alignment structure of claim 4, wherein each of the central mirrors is oriented and positioned to split an edge portion of the collimated light spot into a plurality of peripheral components and reflect the peripheral components onto the corresponding peripheral mirrors.

6. The alignment structure of claim 5, wherein the peripheral mirrors are adjusted and oriented to reflect the peripheral components to propagate through the peripheral apertures and converge at the camera.

7. The alignment structure of claim 1, further comprising a kinematic stage for disposing the focusing members of the camera thereon.

8. The alignment structure of claim 7, wherein the kinetic stage is operative to translate and rotate the focusing members with 6 degrees of freedom.

9. A single-element multiple-field camera system, comprising:
    a camera, comprising:
        a plurality of focusing members; and
        a common focal plane array of a plurality of detectors of the focusing members; and
    an alignment structure, comprising:
        a light source, operative to generate a light beam suitable for spectral characteristics of the camera;
        a collimator, disposed along an optical path of the light beam generated by the light source; and
        a multiple-beam generator, disposed along an optical path of the light beam propagating through the collimator.

10. The camera system of claim 9, wherein the focusing members are integrated into a single slab of material.

11. The camera system of claim 10, wherein the material includes silicon.

12. The camera system of claim 9, wherein the collimator is operative to collimate the light beam generated by the light source into a collimated spot light with a dimension larger than one detector and smaller than three detectors of the focal plane array.

13. The camera system of claim 9, wherein the multiple-beam generator comprises:
   a platform disposed perpendicular to propagation of the collimated spot light;
   a central aperture perforated through the platform and aligned with centroid of the collimated spot light;
   a plurality of first mirrors mounted on the platform, the first mirrors being positioned and oriented to split an edge portion of the collimated spot light into a plurality of peripheral components;
   a plurality of peripheral apertures perforating through the platform around the central aperture; and
   a plurality of second mirrors mounted on the platform, the second mirrors being positioned and oriented to reflect the peripheral components to propagate through the peripheral apertures and converge at the camera.

14. An alignment structure for a camera including a plurality of focusing members and a common focal plane array of a plurality of pixels, the alignment structure comprising:
   a light source for generating a light beam suitable for spectral characteristics of the camera;
   a collimator for collimating the light beam into a light spot with a predetermined dimension; and
   a multiple-beam generator for splitting the light spot into one central component and four peripheral components incident on the focusing members, such that one central spot image and four peripheral spot images are formed on the focal plane array for each focusing member; and
   a kinematic stage for translating and rotating the focusing members to align the central and peripheral spot images formed by one focusing member with the central and peripheral spot images formed by another focusing members.

15. The alignment structure of claim 14, wherein the multiple-beam generator is operative to generate the central and peripheral components converging at the focusing members within field of views of the focusing members.

16. An alignment method for a camera with a multiple-element lens and a focal plane array of pixels, comprising:
   generating a light beam;
   collimating the light beam into a light spot with a predetermined dimension;
   split the light spot into one central component and a plurality of peripheral components about the central component;
   capturing multiple fields of images by the focal plane array, wherein each field includes one central spot image and a plurality of peripheral spot images; and
   translating and rotating the multiple-element lens to focus the central and peripheral spot images for each field and minimize distances of the corresponding spot images between different fields.

17. The alignment method of claim 16, wherein the step of generating a light beam includes generating a light beam in accordance with spectral characteristics of the camera.

18. The alignment method of claim 17, wherein the step of translating and rotating the multiple lens comprises:
   a) translating the multiple-element lens along a first direction for coarsely focusing the spot images;
   b) rotating the multiple-element lens about the first direction for minimizing distance of the central spot images between the fields;
   c) translating the multiple-element lens along a second direction and a third direction perpendicular to the first direction for offsetting difference of origins between fields;
   d) rotating the multiple-element lens about the first direction for refining alignment of the central spot images between the fields;
   e) rotating the multiple-element lens about the second direction to minimize distance of the peripheral spot images captured along the second direction between the fields;
   f) rotating the multiple-element lens about the third direction to minimize distance of the peripheral spot images captured along the third direction between the fields; and
   g) translating the multiple-element lens along the first direction for further focusing the spot images.

19. The alignment method of claim 18, further comprising repeating steps (d) to (f) until the distances of the central spot images and the peripheral spot images between the fields are within a predetermined tolerance.

20. The alignment method of claim 19, wherein the predetermined tolerance is 1/10 pixel.

21. The alignment method of claim 20, further comprising repeating step (g) until the spot images are focused within a predetermined tolerance.

22. The alignment method of claim 16, wherein the step of collimating the light beam includes collimating the light beam into the light spot with a dimension larger than one pixel and smaller than three pixels of the camera.

23. The alignment method of claim 16, wherein the step of splitting the light spot further includes converging the central and peripheral components at the multiple-element lens with angles within field of view of the camera.

24. An alignment method for a multiple-field single-element camera with a common focal plane, comprising generating a plurality of spot images for each field of the camera from the same light source and aligning the camera by minimizing distances of corresponding spot images between the fields.

* * * * *